United States Patent [19]

Kidani et al.

[11] Patent Number: 5,129,206
[45] Date of Patent: Jul. 14, 1992

[54] CHEESE TRANSPORTING AND PROCESSING APPARATUS

[75] Inventors: Shuji Kidani; Koji Sakashita, both of Kanazawa, Japan

[73] Assignee: Kabushiki Kaisha Murao and Company, Kanazawa, Japan

[21] Appl. No.: 681,059

[22] Filed: Apr. 5, 1991

[30] Foreign Application Priority Data

Apr. 13, 1990 [JP] Japan .................. 2-98983
Apr. 13, 1990 [JP] Japan .................. 2-98984

[51] Int. Cl.⁵ .......................................... B65B 35/10
[52] U.S. Cl. .................................... 53/116; 53/168; 53/249
[58] Field of Search ............... 53/116, 430, 249, 204, 53/443, 542

[56] References Cited

U.S. PATENT DOCUMENTS

| | | | |
|---|---|---|---|
| 2,383,664 | 8/1945 | Malhiot | 53/204 X |
| 3,538,992 | 11/1970 | Chauhan | 53/542 X |
| 3,946,884 | 3/1976 | Kato et al. | 53/540 X |
| 4,020,617 | 5/1977 | Sickinger | 53/542 X |
| 4,498,276 | 2/1985 | Reed | 53/204 X |
| 4,731,977 | 3/1988 | Maekawa | 53/247 X |

FOREIGN PATENT DOCUMENTS

2164909 4/1986 United Kingdom .

*Primary Examiner*—James F. Coan
*Attorney, Agent, or Firm*—Oblon, Spivak, McClelland, Maier & Neustadt

[57] ABSTRACT

The invention provides a cheese transporting processing apparatus for classifying cheeses wound up by winders or the like for different types and packing and carrying out the thus classified cheeses. When a cheese is transported by an overhead conveyor with a type identifying unit, information of a type of the cheese is written into the type identifying unit. In accordance with such type information, cheeses are stocked for different types into a cheese stocker. In response to a demanding instruction from a packing line, cheeses of a specified type are discharged from the cheese stocker and boxed and packed. Such sequence of operations is performed automatically on the cheese transporting processing apparatus.

9 Claims, 10 Drawing Sheets

CHEESE TRANSPORTING AND PROCESSING APPARATUS

BACKGROUND OF THE INVENTION

This invention relates to a cheese transporting processing apparatus for classifying cheeses wound up by winders or the like in a textile factory into groups of different types, stocking the thus classified cheeses therein and packing the thus stocked cheeses into predetermined styles of packing.

In a textile factory, yarns which have been processed by predetermined working are, in most cases, wound up into cheese-like profiles to facilitate handling at succeeding steps. In order to make such cheeses, a winder for the exclusive use is employed often, but is not a rare case that yarn is wound up directly into a cheese of a predetermined profile by means of a working machine such as a twisting machine or a drawing machine.

Meanwhile, a cheese wound up by such working machine (hereinafter referred to as a winder or winders or the like) is transported to a next step by way of a suitable transporting line. However, if cheeses of yarns of different types are transported in a mixed condition along the transporting line, then many skilled workers are required for the identification, classification or the like of the cheeses. Particularly where productoon of many types in small quantities is popular as in recent years, it is a rare case that yarns of a single type are worked on all of winders or the like, and operation for the classification or the like of cheeses makes an essential step.

Conventionally, such identification or classifiction of cheeses relies upon a hand of a human being. Consequently, the working efficiency is low, and it is difficult, depending upon circumstances of labor or the like, to maintain 24-hour operation of winders or the like. Thus, it is a very serious problem that the production efficiency of the entire factory is very low.

Further, where a next step is to be performed in another factory, cheeses wound up by winders or the like must be packed suitably and then shipped. However, an automated line which classifies cheeses of different types and packs the thus classified cheeses into predetermined styles of packing have not been put into practical use as yet.

On the other hand, while wound up cheeses are transported to a next step by means of a suitable transporting system, a cheese stocker is employed commonly in order to attaiin suitable matching between the production capacity of winders or the like and the processing capacity at the next step.

The cheese stocker can accept and temporarily stock a predetermined amount of cheeses therein and can forward such cheeses therefrom in response to an instruction. An exemplary one of conventional cheese stockers includes a pair of holder rods which are provided for up and down movement on the opposite sides of a long stocking conveyor and to which cheeses transported thereto by way of the stocking conveyor are scooped up and transported so that the cheeses are left as they are and stocked after then. The distance between the holder rods is greater than the width of the stocking conveyor but is smaller than the diameter of a cheese, and a plurality of pairs of such holder rods are provided at several stages in a vertical direction. It is to be noted that when the cheeses are to be transported from the cheese stocker, the holder rods are lowered to transfer the cheeses back to the stocking conveyor, and then the stocking conveyor is operated.

With such a prior art arrangement, cheeses are placed onto the stocking conveyor in such a manner as to make a row and then transported into the cheese stocker. Thus, since cheeses are placed directly onto the stocking conveyor, there is little possibility that an outer surface of a cheese may be damaged mechanically. Then, in order to prevent such possible damage, it is preferable to employ a tray or the like for protection when a cheese is to be transferred to the stocking conveyor, and besides, it is desirable to maintain such condition also after the cheese is transported from the stocking conveyor. However, since such a conventional cheese stocker employs only one fixed stocking conveyor for the transportation of cheeses into and out of the cheese stocker, there is a problem that discharging processing of an empty tray after a cheese is carried in and supplying processing of an empty tray for the carrying out of a cheese are very difficult.

SUMMARY OF THE INVENTION

It is an object of the present invention to provide a cheese transporting processing apparatus which can automatically classify and stock therein cheeses of different types, pack the cheeses into predetermined stles of packing for the different types and discharge the thus packed cheeses therefrom.

It is another object of the present invention to provide a cheese transporting processing apparatus which can transport, whether a cheese is to be carried into or out from a cheese stocker, a cheese by means of a tray and minimize the possibility of damage to a cheese by the cheese stocker.

DETAILED DESCRIPTION OF THE INVENTION

Figure 1:
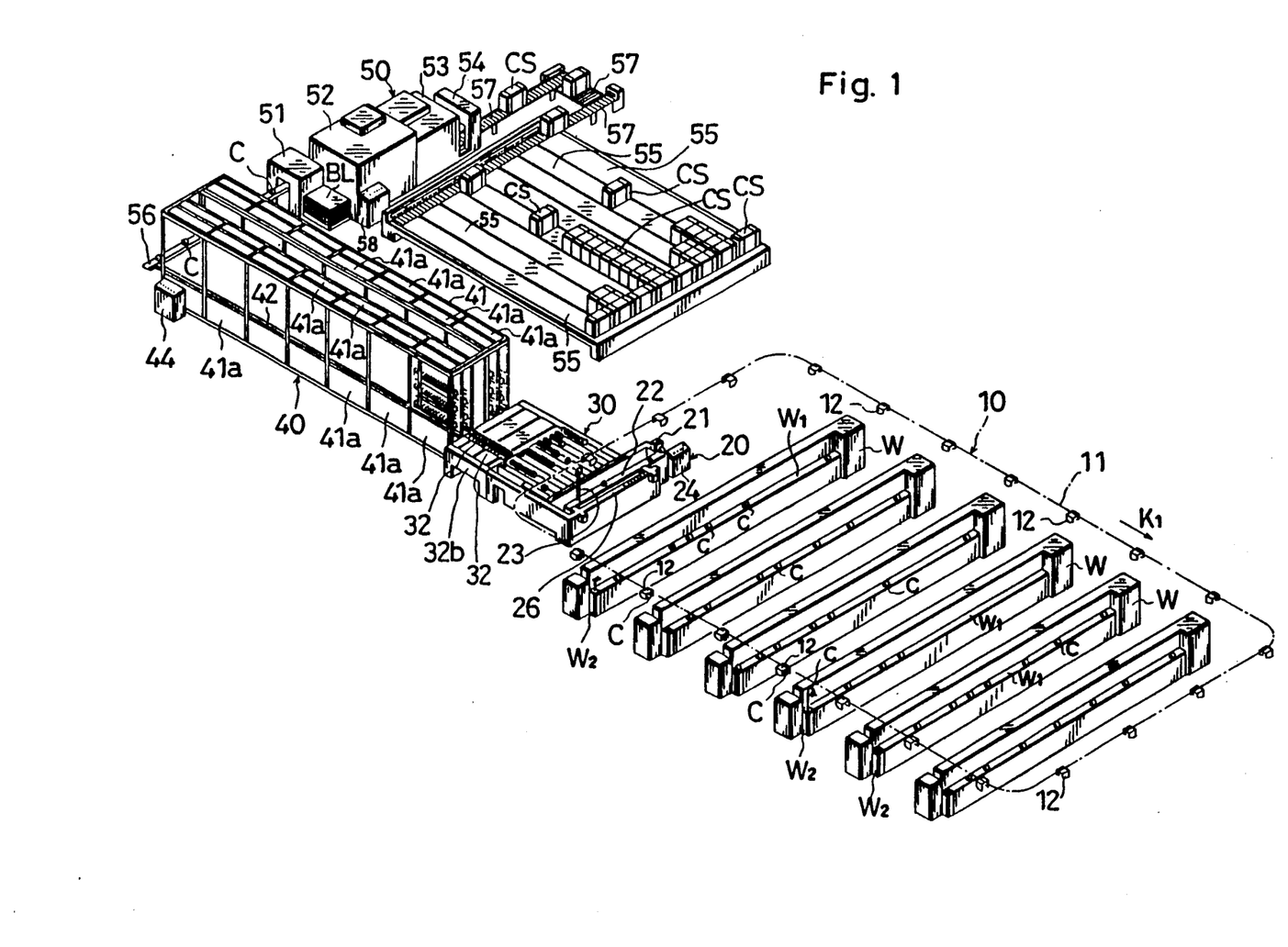
FIG. 1 is a perspective view of an entire cheese transporting processing apparatus showing a preferred embodiment of the present invention.

Referring first to FIG. 1, a cheese transporting apparatus includes an overhead conveyor 10, an inspecting device 20, a stock line 30, a cheese stocker 40 and a packing line 50.

The overhead conveyor 10 includes a large number of carriers 12 which are driven to move by a transport chain 11. The carriers 12 individually carry thereon cheeses C wound up by a plurality of winders W and transport the cheeses C to the inspecting device 20.

Figure 2:
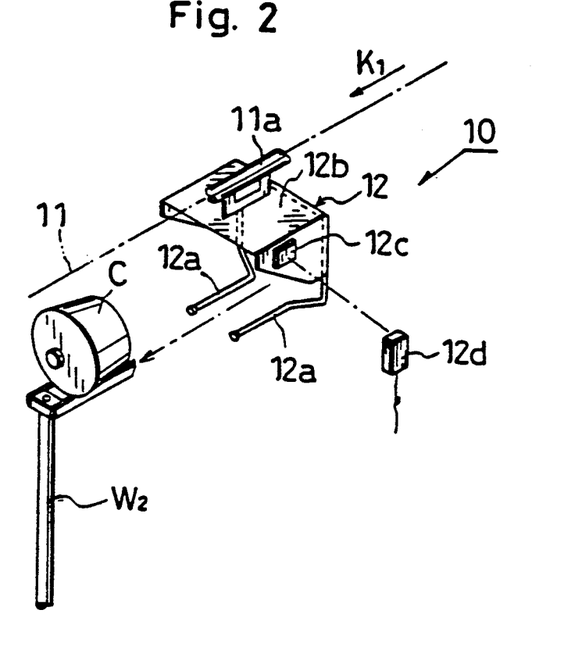
FIG. 2 is an illustrative perspective view illustrating a carrier of an overhead conveyor shown in FIG. 1 which cooperates with a lifter.

A cheese discharging conveyor W1 and a lifter W2 for loading a cheese C onto a carrier 12 are provided for each of the winders W. When cheeses C wound up by any of the winders W are transported to the position of the corresponding lifter W2 by the corresponding cheese discharging conveyor W1, they are pushed up one by one to a location forwardly of a carrier 12 by the lifter W2 as seen in FIG. 2 and wait at the location. If the lifter W2 is moved down when a pair of support rods 12a of the carrier 12 are advances to a position below the cheese C, then the cheese C is transferred from the lifter W2 to the carrier 12. It is to be noted that a hood 12b is provided on each of the carriers 12, and a type identifying unit 12c is provided on a side face of the hood 12b. Meanwhile, the chain 11 for driving the carriers 12 extend in a guide pipe 11a and is continuously circulated in the direction indicated by an arrow mark K1 in FIGS. 1 to 3 by a driving source not shown.

A terminal unit 12d is disposed in the neighborhood of each of the lifters W2 and makes a pair together with a type identifying unit 12c (FIG. 2). The terminal unit 12d is connected to a controller not shown and transmits information of a type of a cheese C transferred from the lifter W2 and based on information received from the corresponding winder W to the carrier 12, for example, by an infrared ray optical communication system so as to write such information into the tyoe identifying unit 12c, and the type identifying unit 12 stores the thus written information therein.

Figure 4:
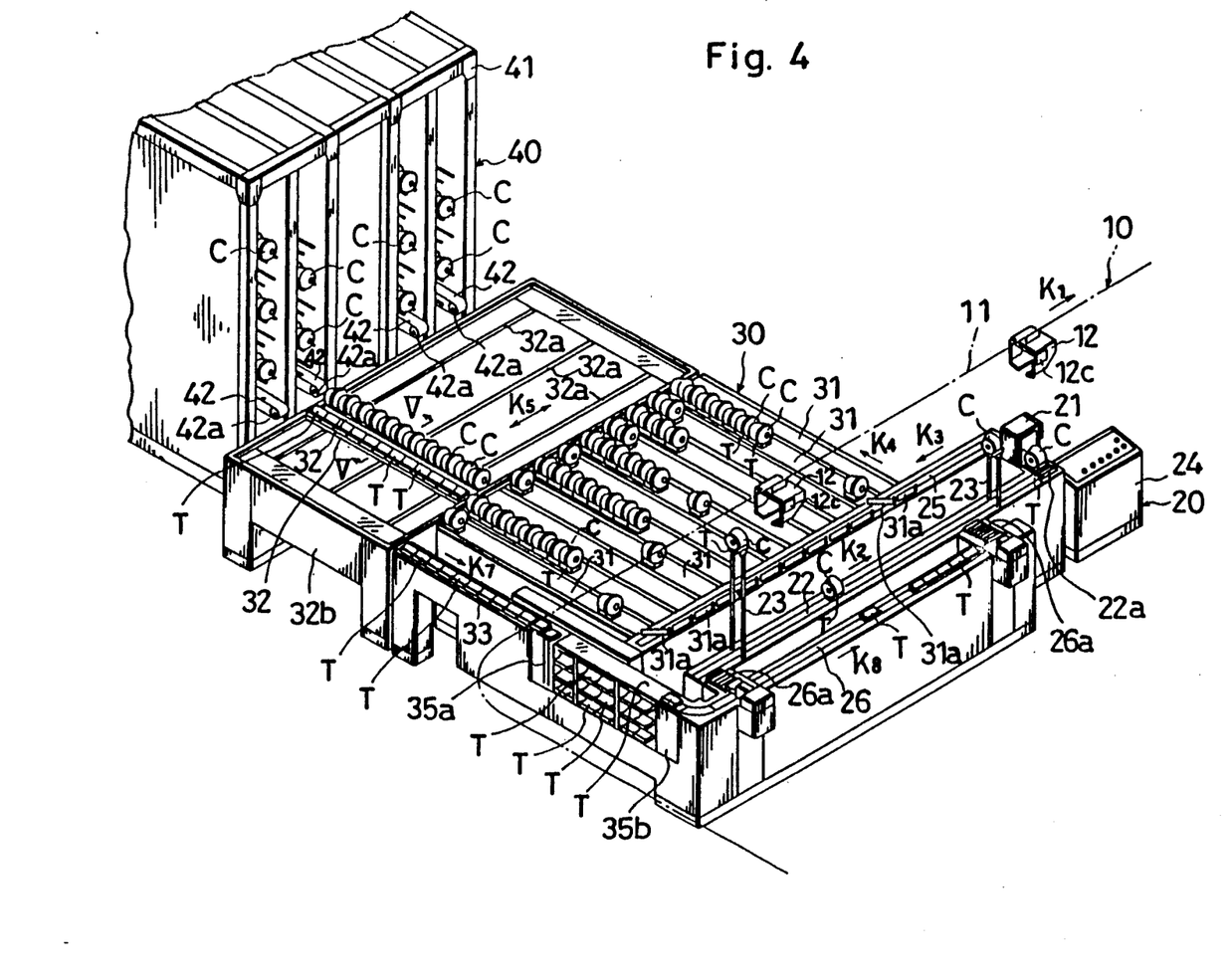
FIG. 4 is a perspective view illustrating a stock line shown in FIG. 1.

Referring now to FIG. 4, the inspecting device 20 includes a tunnel-shaped inspecting unit 21, a carrying in conveyor 22, a pair of unloaders 23 and a controlling device 24.

Figure 3:
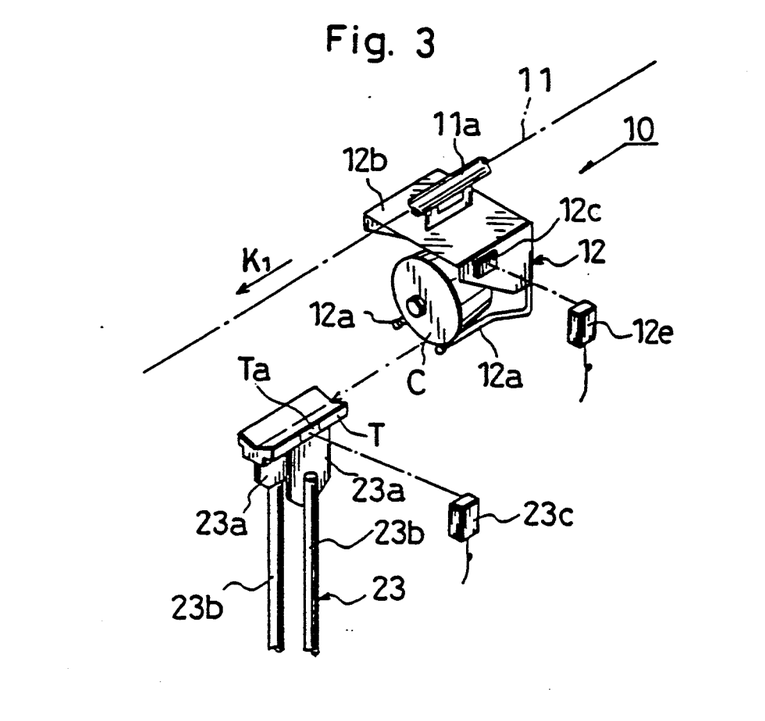
FIG. 3 is a similar view but illustrating the carrier cooperating with an unloader.

The carrying in conveyor 22 is disposed just below the overhead conveyor 10, and the unloaders 23 are disposed on the upstream side and the downstream side of the carrying in conveyor 22 which advances in the direction indicated by an arrow mark K2 in FIG. 4. Referring to FIG. 3, each of the unloaders 23 includes a pair of expansible rods 23b each having a tray receiver 23a at an upper end thereof. The unloader 23 receives a tray T on the tray receivers 23a thereof and then is lifted to and waits at a location forwardly of a carrier 12. Then, when a carrier 12 carrying a cheese C thereon advances to the position just above the tray T, the tray T is lifted further by a small stroke so that the cheese C is transferred from the carrier 12 to the tray T. After the carrier 12 passes, the expansible rods 23b are contracted thereby to transfer the tray T having the cheese C carried thereon to the carrying in conveyor 22, thereby completing the unloading operation of the cheese C.

Another terminal unit 12e is disposed in the neighborhood of each of the unloaders 23 disposed along a locus of passage of such carrier 12 and makes a pair together with the type identifying unit 12c. The terminal unit 12e can read type information stored in the type identifying unit 12c by way of an optical communication system similar to that of the terminal unit 12d. Accordingly, the terminal unit 12e can read information of a type of a cheese C transferred from a carrier 12 to the carrying in conveyor 22 by the unloader 23 and forward the thus read information to the controlling device 24. As such type identifying unit described above, for example, an optical communication ID system by SUNX company can be listed.

Referring to FIG. 4, the inspecting unit 21 is disposed on the downstream side of the carrying in conveyor 22 by way of a short roller conveyor 22a. The inspecting device 21 includes, for example, a weight sensor and an optical sensor for measuring a weight and a size of a cheese C, and outputs of the sensors are forwarded to the controlling device 24. Here, since type information is inputted in advance to the controlling device 24 from the terminal units 12e, the controlling device 24 determines acceptance or rejection of a cheese C carried in to the inspecting unit 21 based on acceptance/rejection criteria set for each of the types.

Among cheeses C discharged from the inspecting unit 21, acceptable articles are transported to the stock line 30 by way of a discharging conveyor 25 while rejected articles are discharged onto a rejected article line not shown.

The stock line 30 includes a combination of a plurality of stock conveyors 31 and a pair of traverse conveyors 32 disposed on the downstream side of the stock conveyors 31 as shown in FIG. 4.

The upstream sides of the stock conveyors 31 are connected to the discharging conveyor 25 each by way of a shutter 31a. In particularly, a cheese C discharged in the direction indicated by an arrow mark K3 in FIG. 4 from the inspecting unit 21 operates, when it reaches one of the shutters 31a, the shutter 31a, and consequently, the cheese C is introduced to the corresponding stock conveyor 31 (in the direction indicated by an arrow mark K4 in FIG. 4). Here, the shutters 31a are individually controlled to be opened or closed by the controlling device 24 in response to information of a type of the cheese C. In particular, cheeses C transported on the discharging conveyor 25 are tracked for positions thereof by the controlling device 24, and when a cheese C of a specific type comes to a position of a specific one of the stock conveyors 31, the shutter 31a for the specific stock conveyor 31 is operated so that the cheese C is introduced into the specific stock conveyor 31. Consequently, cheeses C which are classified for individual types can be accepted by and stocked on the individual stock conveyors 31. It is to be noted that a stopper gate not shown is provided on the downstream side of each of the stock conveyors 31 so that it can temporarily stop a flow of cheeses C on the stock conveyor 31.

The traverse conveyors 32 can be traversed in either of leftward and rightward directions as indicated by a double-sided arrow mark K5 in FIG. 4. Meanwhile, the length of the traverse conveyors 32 is such that a predetermined number of cheeses C to be stocked on each of the stock conveyors 31 can be transferred at a time.

When a predetermined number of cheeses C are stocked on a particular stock conveyor 31, the traverse conveyors 32 are moved to the position corresponding to the particular stock conveyor 31, and then the stopper gate is opened to discharge the cheeses C from the stock conveyor 31 onto one of the traverse conveyors 32. In this instance, it is assumed that the cheeses C are transferred to the left-hand side traverse conveyor 32 in FIG. 4 while they are kept carried on the trays T.

Figure 5:
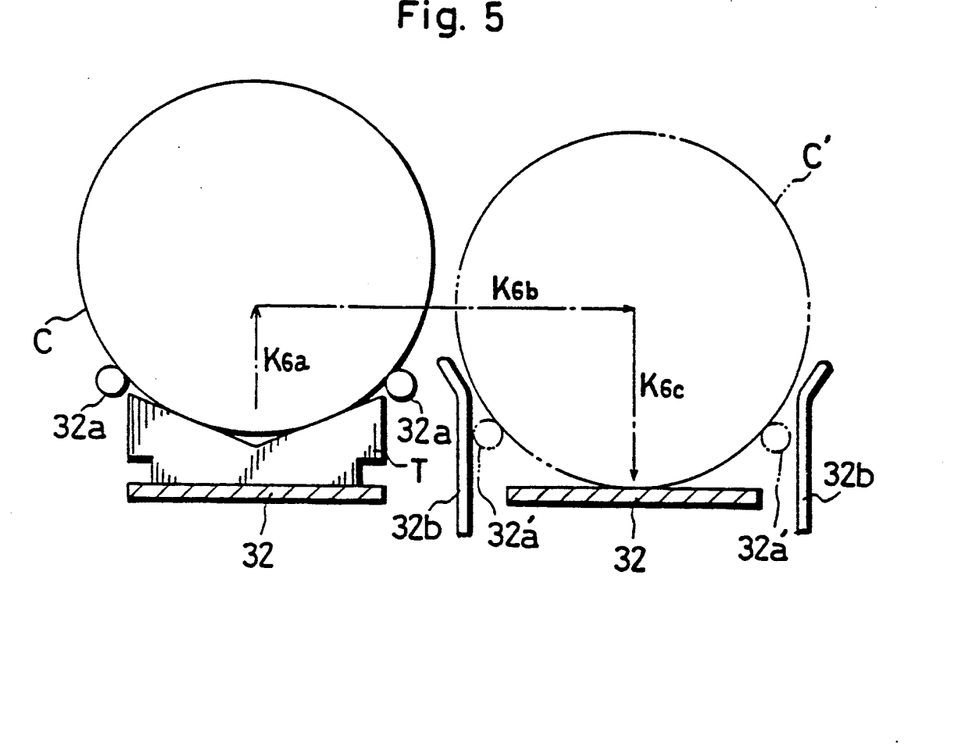
FIG. 5 is an enlarged sectional view taken along line V—V of FIG. 4.

Subsequently, only the cheeses C are transferred to the right-hand side traverse conveyor 32 using a transferring mechanism not shown while only the thus emptied trays T are left on the left-hand side traverse conveyor 32, thereby entering such a condition as shown in FIG. 4. It is to be noted that the transferring device here may include, for example, a pair of parallel rods 32a provided above the traverse conveyors 32 as shown in FIG. 5. With the transferring device, the cheeses C can be transferred at a time by moving the parallel rods 32a from one to the other of the traverse conveyors 32 (successively in the directions indicated by arrow marks K6a, K6b and K6c in FIG. 5). It is to be noted that, for the right-hand side traverse conveyor 32 to which only cheeses C are to be transferred, a pair of suitable guides 32b are preferably provided in order to prevent dropping of such cheeses C from the right-hand side traverse conveyor 32.

Referring back to FIG. 4, the traverse conveyors 32 are carried on a frame 32b having a plurality of traverse rails 32a thereon. Further, a return conveyor 33 for returning empty trays T in the direction indicated by an arrow mark K7 in FIG. 4 is disposed in parallel to the stock conveyors 31. Further, a tray stocker 35 for stocking trays T at a plurality of stages is disposed on the downstream side of the return conveyor 33, and a loader 35a for loading trays T from the return conveyor 33 into the tray stocker 35 and an unloader 35b for taking out trays T from the tray stocker 35 and discharging them to the tray conveyor 26 are provided for the tray stocker 35. It is to be noted that the tray conveyor 26 is provided in a juxtaposed relationship to the carrying in conveyor 22 and can advance in the direction indicated by an arrow mark K8 in FIG. 4 and supply trays T to the carrying in conveyor 22 by way of a plurality of roller conveyors 26a.

Here, cheeses C are transported from a point at which they are unloaded from the overhead conveyor 10 to a position on the traverse conveyor 32 immediately before the cheese stocker 40 while they are individually carried on trays T. Meanwhile, empty trays T on one of the traverse conveyors 32 are transported by way of the return conveyor 33 and temporarily stocked in the tray stocker 35, and then they are taken out from the tray stocker 35 in response to a number of cheeses C supplied from the overhead conveyor 10 and are supplied to the carrying in conveyor 22. Such cheese C are used on the carrying in conveyor 22 one by one by the unloaders 23.

Referring now to FIGS. 1 and 4, the cheese stocker 40 includes a plurality of stocking blocks 41a formed in the inside of a vertically elongated frame 41. Here, the frame 41 shown has a plurality of stocking blocks 41a disposed in 7 blocks in a longitudinal direction and in 4 blocks in a lateral direction. It is to be noted that a stocking conveyor 42 is provided for each longitudinal row of the stocking blocks 41a and extends along such longitudinal row fully between a pair of pulleys 42a provided at the opposite ends of the longitudinal row.

Figure 8:
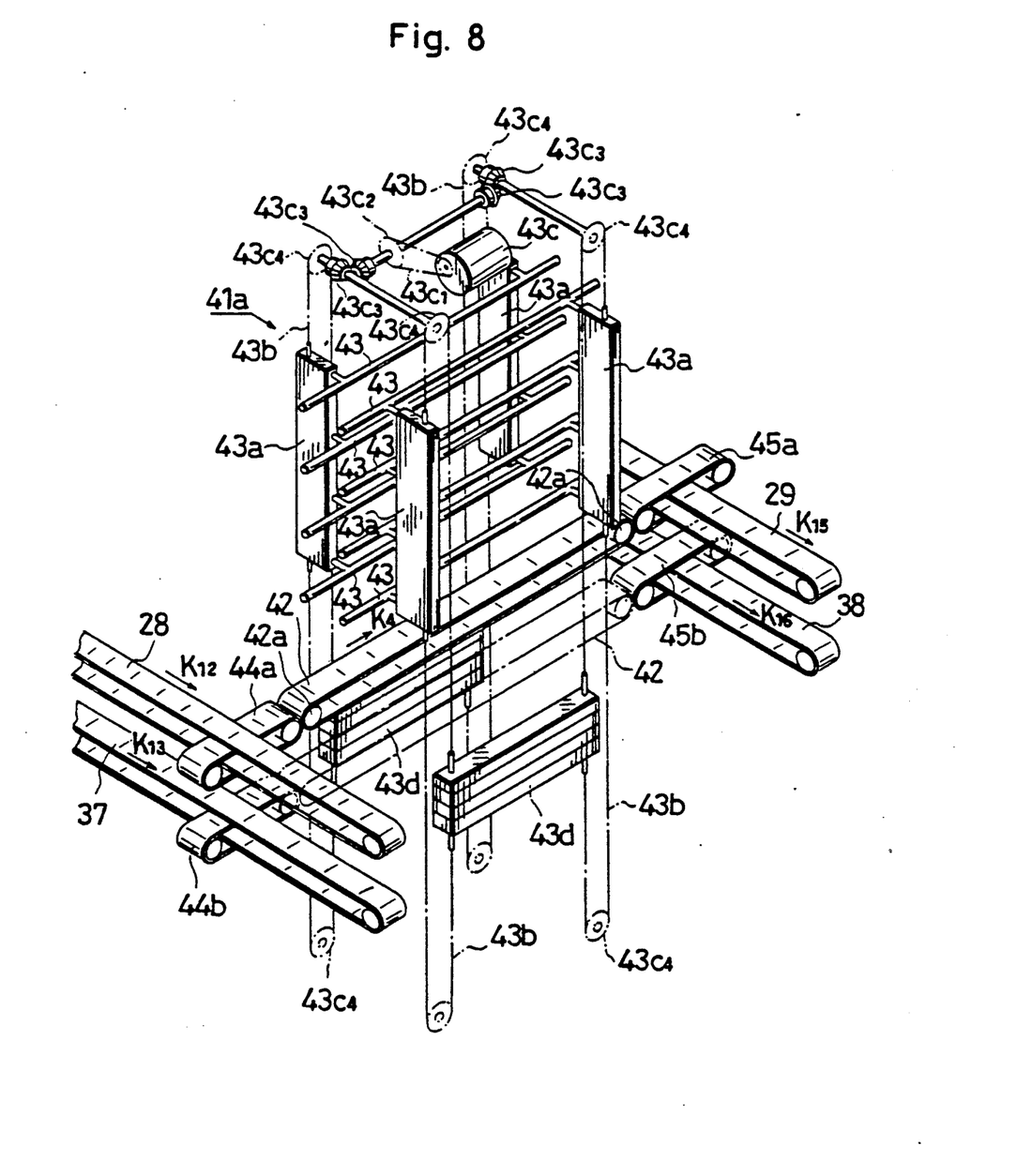
FIG. 8 is a perspective view illustrating a cheese stocker shown in FIG. 7.

Referring now to FIG. 8 which shows another embodiment of the present invention which will be hereinafter described, a plurality of holder rods 43 are disposed for each of the stocking blocks 41a such that they are moved up and down on the opposite sides of the stocking conveyors 42. The holder rods 43 are disposed at a plurality of stages in pairs, and the distance between them in pair is greater than the width of the stocking conveyors 42 but smaller than the diameter of a cheese C as shown in FIG. 6.

The holder rods 43 are supported at the opposite end portions thereof on four plate-shaped support blocks 43a, and the support blocks 43a can be moved up or down at a time by way of corresponding chains 43b which are driven by a motor 43c. The chains 43b are each connected in an endless manner by way of a counterweight 43d, and the chains 43b and the motor 43c are connected to each other by way of a motion transmitting mechanism which includes a chain motor 43c1, a sprocket wheel 43c2, a plurality of bevel gears 43c3, a plurality of sprocket wheels 43c4 and so forth.

Figure 6:
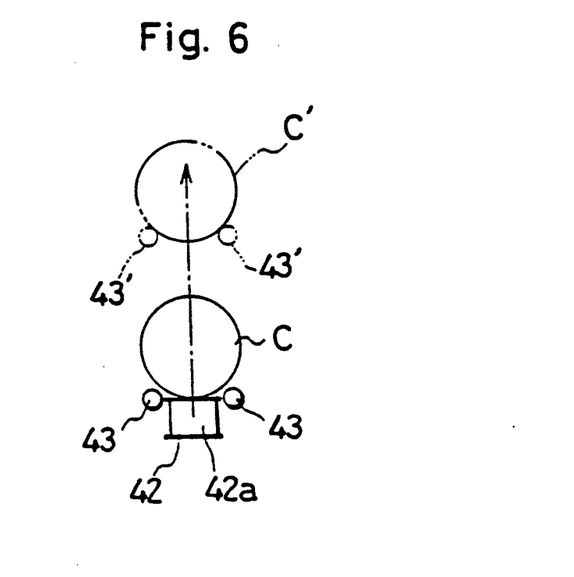
FIG. 6 is a diagrammatic view illustrating operation of a cheese stocker.

Now, if a pair of ones of the holder rods 43 at an arbitrary stage are stopped at a full line position shown in FIG. 6 and then a group of cheeses C are carried in to the position of the corresponding stocking block 41a by the corresponding stocking conveyor 42 whereafter the holder rods 43 are moved up, then the cheeses C are picked up by the pair of holders 43 (indicated by alternate two long and short dashes lines in FIG. 6), and consequently, they can be put into and stocked in the stocking block 41a to which the holder rods 43 belong. On the other hand, the cheeses C stocked in this manner are returned to the stocking conveyor 42 by moving down the holder rods 43, and the thus returned cheeses C are discharged from the cheese stocker 40 by operation of the stocking conveyor 42.

The cheese stocker 40 stocks cheeses C in an order beginning with the top stage and discharges such cheeses in an order beginning with the bottom stage using the holder rods 43 in pairs at each of the stages. Meanwhile, the holder rods 43 have a length sufficient to allow a predetermined number of cheeses C carried on a stock conveyor 31 or traverse conveyor 32 shown in FIG. 4 to be stocked at a time thereon. In particular, the cheese stocker 40 can stock, for each stage of the stocking blocks 41a thereof, a predetermined number of cheeses C stocked on a stock conveyor 31 and carried in by way of the traverse conveyors 32.

Referring to FIG. 1, a controlling device 44 is provided for the cheese stocker 40 and electrically connected to the controlling device 24. Information of types of cheeses C carried in by way of the traverse conveyors 32 is transmitted from the controlling device 24 to and stored into the controlling device 44. The controlling device 44 specifies a stocking block 41a and a stage of the stocking block 41a into which the cheeses C carried in are to be stocked, then controls the traverse conveyor 32 on which the cheeses C are carried to move to the position of that one of the stocking conveyors 42 which extends along the specified stocking block 41a, and then controls the traverse conveyor 32 and stocking conveyor 42 to operate simultaneously to carry the cheeses C into the cheese stocker 40. After the cheeses C of the specified type are thus stocked to the particular location of the cheese stocker 40, the controlling device 44 writes information of the type of the cheeses C corresponding to the specified stage of the cheese stocker 40.

The packing line 50 includes a can producing machine 51, a boxing device 52, a sealing machine 53, a bundling device 54 and a plurality of case stockers 55 which are all interconnected by a cheese conveyor 56 and a plurality of case conveyors 57. Further, a controlling device 58 is provided for the packing line 50.

Now, if an instruction to box cheeses C of a specific type is entered using the controlling device 58, then such boxing instruction is transmitted to the controlling device 44 of the cheese stocker 40, and the controlling device 44 causes the cheese stocker 40 to discharge cheeses C of the specified type therefrom. The thus discharged cheeses C are transported to the boxing device 52 by way of the cheese conveyor 56 while the can producing machine 51 produces a case CS using a case blank BL and forwards the thus produced case CS to the boxing device 52.

The boxing device 52 boxes the cheeses C into the case CS, and the sealing machine 53 seals the case CS and prints predetermined items on the case CS to provide an indication of predetermined information. It is to be noted that such indication may include, in addition to information of the type of the cheeses C instructed from the controlling device 58, a quantity, a weight, a grade of quality and so forth of the cheeses C. Particularly, data of the grade of quality and so forth of the cheeses C, which are collected by the inspecting unit 21, can be transmitted to the can producing machine 53 by way of the controlling devices 24, 44 and 58. In this instance, however, the stock conveyors 31 and the cheese stocker 40 must stock therein cheeses C which are classified not only by the type but also by the grade of quality.

The case CS in which the cheeses C are boxed is bundled by the bundling device 54 and is discharged to one of the case stockers 55 for the type by way of the case conveyors 57 so that they are thereafter stocked on the case stocker 55.

As described so far, with the transporting processing apparatus, even if cheeses C wound up by the winders W are, for example, of different types for the individual winders W, information of the types is written into and stored in the type identifying unit 12c belonging to the overhead conveyor 10 for the individual cheeses C and is then read and transmitted, when the cheeses C are transported, to the controlling device 24 of the inspecting device 20. Thus, the inspecting device 20 inspects the cheeses C individually in accordance with the type information and classifies and stocks the cheeses C on the stock conveyors 31 for the individual types.

Further, the cheeses C on the stock conveyors 31 are delivered for each predetermined unit quantity by way of the traverse conveyors 32 and carried into and stocked in a particular stage of a particular stocking block 41a of the cheese stocker 40 for the type. Then, the cheese stocker 40 discharges predetermined cheeses C to the packing line 50 in accordance with a boxing instruction from the controlling device 58 of the packing line 50, and the packing line 50 boxes the cheeses C into a case CS and discharges the case CS onto one of the case stockers 55 for the type of the cheeses C so that they may be thereafter stocked on the case stocker 55.

It is to be noted that a type identifying unit not shown is provided for each stage of the cheese stocker 40 for reading and confirming, when specified cheeses C are to be discharged from the cheese stocker 40, contents of them. Especially, even if a stocked location of cheeses C is changed by manual operation due to incomplete operation of the cheese stocker 40, if information of a type of the cheeses C thus moved is manually written into the corresponding type identifying unit to update the stored information, then returning operation to full automatic operation can be performed very smoothly.

A unit number of cheeses C to be discharged from the cheese stocker 40 to the packing line 50 should normally be a number of cheeses C which are to be boxed into a case CS. Thus, if the quantities of cheeses C to be handled by the stock conveyors 31 and traverse conveyors 32 and the quantity of cheeses C to be stocked in each stage of the cheese stocker 40 are also standardized to such boxing unit, then the handling units of cheeses C at all of the equipments from the stock conveyors 31 to the packing line 50 can be standardized to the boxing unit, and there is no necessity of taking cumbersome fraction processing into consideration.

Further, while cheeses C from the inspecting device 20 to the entrance of the cheese stocker 40 are transported by way of trays T, a type identifying unit (for example, an ID unit by SUNX company) may be provided for each of such trays T. In this instance, the controlling device 24 writes, at a point of time when a cheese C is unloaded from the overhead conveyor 10, information of the type of the cheese C into the type identifying unit belonging to the tray T of the cheese C. Thus, type information of the type identifying unit of each tray T is read at a location in the neighborhood of each shutter 31a, and the shutter 31a is controlled to be opened or closed in accordance with the thus read type information. Consequently, cumbersome tracking operation of the cheeses C can be omitted completely.

As described so far, according to the present apparatus, as an overhead conveyor with a type identifying unit, a stock line for classifying cheeses from an inspecting device and stocking the thus classified cheese therein, a cheese stocker and a packing line are interconnected, the type identifying unit can transmit information of a type of a cheese wound up by a winder or the like to the inspecting device, and the stocking line can classify cheeses in accordance with such type information and the cheese stocker and packing line can stock and pack those cheeses for different types, respectively. Consequently, cheese identifying, classifying and packing operations which conventionally require a great number of hands can be fully automated. Accordingly, there is a superior effect that the production efficiency of the entire factory can be improved remarkably.

Figure 7:
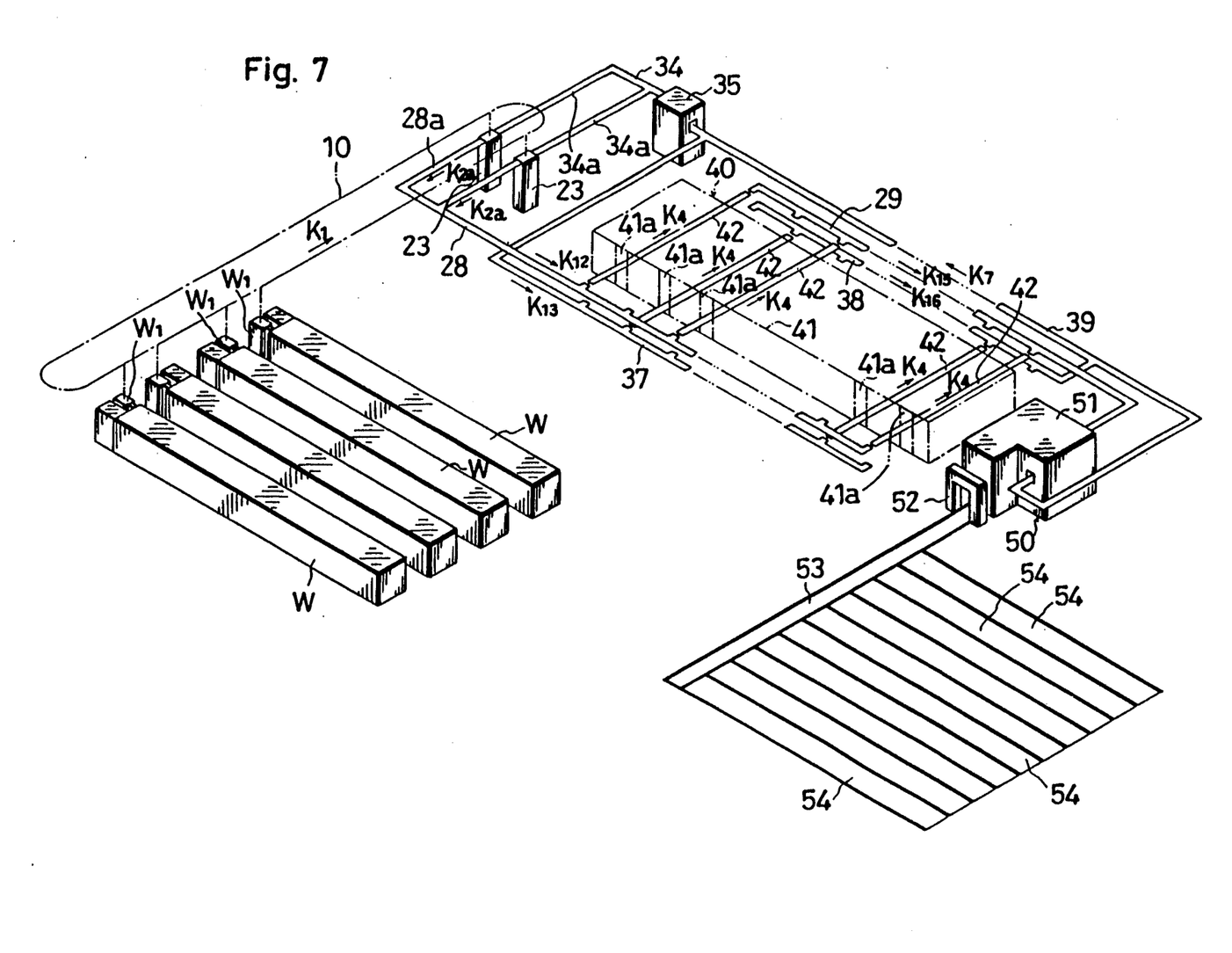
FIG. 7 is an illustrative perspective view showing another cheese transporting processing apparatus according to the present invention.

Referring now to FIG. 7, there is shown another cheese transporting processing apparatus according to the present invention. In the present cheese transporting processing apparatus, a cheese C is stocked in a cheese stocker 40 without provision of a stock line.

In particular, the cheese transporting processing apparatus includes an overhead conveyor 10, a pair of occupied tray conveyors 28 and 29, a pair of empty tray conveyors 37 and 38, a cheese stocker 40 and a packing line 50. The overhead conveyor 10 has a similar construction to that of the overhead conveyor 10 of the preceding embodiment described hereinabove. Also stocking blocks 41a of the cheese stocker 40 have a similar construction to that of the stocking blocks 41a of FIG. 8 described hereinabove.

Meanwhile, an identifying unit Ta is provided for each tray T as shown in FIG. 3, and a terminal unit 23c is provided on an unloader 23 in an opposing relationship to a tray T on the unloader 23. Thus, the terminal unit 12e reads type information from a tray T and transfers the thus read type information to the terminal unit 23c, and the terminal unit 23c writes the thus received type information into the identifying unit Ta. Consequently, an occupied tray T transferred to the occupied tray conveyor 21 has information of a type of the cheese C stored in the identifying unit Ta thereof.

On the other hand, the cheese stocker 40 has a plurality of stocking blocks 41a formed in the inside of a vertically elongated frame 41 (FIG. 7). The occupied tray conveyor 28 and the empty tray conveyor 37 are disposed at two upper and lower stages at a location forwardly of the stocking blocks 41a and are moved in the directions indicated by arrow marks K12 and K13 in FIG. 7, respectively. The stocking conveyors 42 are each moved in the direction indicated by an arrow mark K4. The other occupied tray conveyor 29 and the other empty tray conveyor 38 are disposed at two upper and lower stages at a location rearwardly of the stocking blocks 41a and are moved in the directions indicated by arrow marks K15 and K16, respectively.

A pair of supplying conveyors 44a and 44b and another pair of discharging conveyors 45a and 45b are disposed individually at two upper and lower stages on the upstream side and the downstream side of each of the stocking conveyors 42 of each of the accommodating blocks 41a. However, the supplying conveyors 44a and 44b cross the occupied tray conveyor 28 and empty tray conveyor 37 such that transporting faces thereof may be directed downwardly while the discharging conveyors 45a and 45b cross the occupied tray conveyor 29 and empty conveyor 38 such that transporting faces thereof may be directed upwardly. Meanwhile, an orientation changing device not shown for controlling the orientation of a tray T being transported is disposed in the neighborhood of each of the supplying conveyors 44a and 44b and discharging conveyors 45a and 45b, and the stocking conveyors 42 can be moved upwardly or downwardly by a lifting mechanism not shown to level positions corresponding to the different stage of the supplying conveyors 44a and 44b and discharging conveyors 45a and 45b.

Figure 9A:
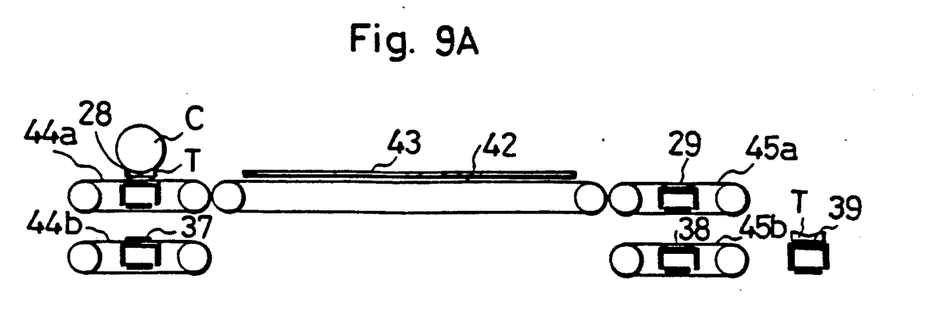
FIGS. 9(A) to 9(E) are diagrammatic views illustrating operation of the cheese stocker shown FIG. 8 when a cheese is to be stocked.
Figure 9B:
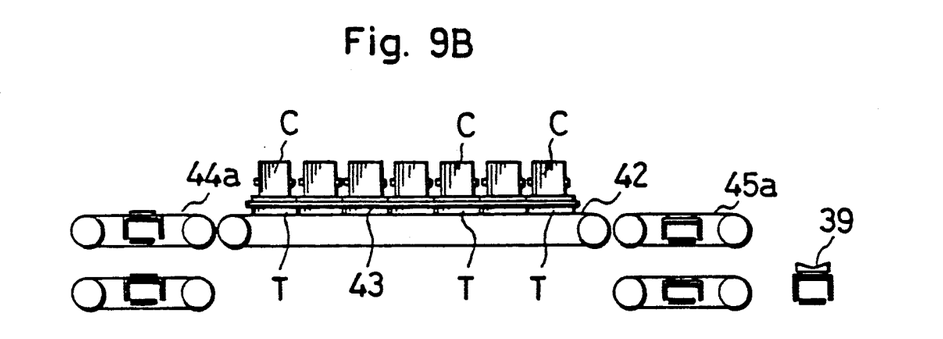

Subsequently, operation of stocking a cheese C onto a pair of holder rods 43 will be described with referenceot FIGS. 9(A) to 9(D). Now, if a stocking conveyor 42 is lifted to its lifted position [FIG. 9(A)], and those of one of pairs of the holder rods 43 at an arbitrary stage are stopped as at a full line position shown in FIG. 6, and then the occupied tray conveyor 28, the supplying conveyor 44a at the upper stage and the stocking conveyor 42 are operated. Consequently, occupied trays T on the occupied tray conveyor 28 are successively transported onto the stocking conveyor 42 [FIG. 9(B)]. In FIG. 9(B), however, also the empty tray conveyor 30 extending in parallel to the empty tray conveyor 38 is shown.

Figure 9C:
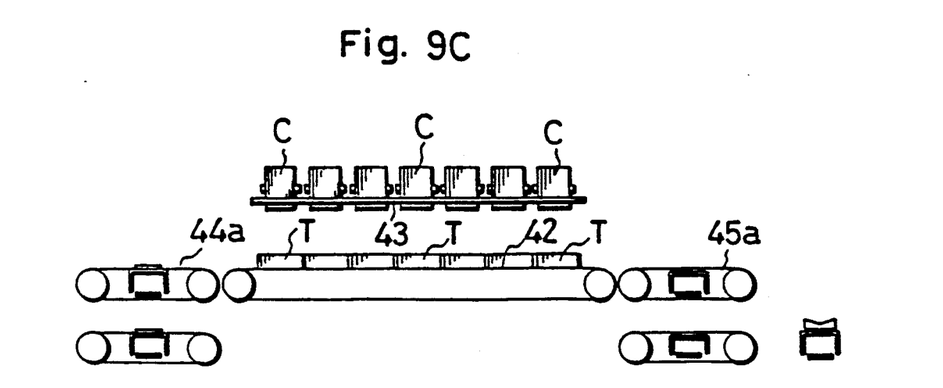

After a predetermined number of occupied trays T are transported onto the stocking conveyor 42, the holder rods 43 are lifted [FIG. 9(C)]. As a result, the cheeses C are transported upwardly by the pair of holder rods 43 at the arbitrary stage and thus stocked into the stocking block 41a to which the holder rods 43 belong while the thus emptied trays T are left on the stocking conveyor 42 [FIG. 9(C)].

Figure 9D:
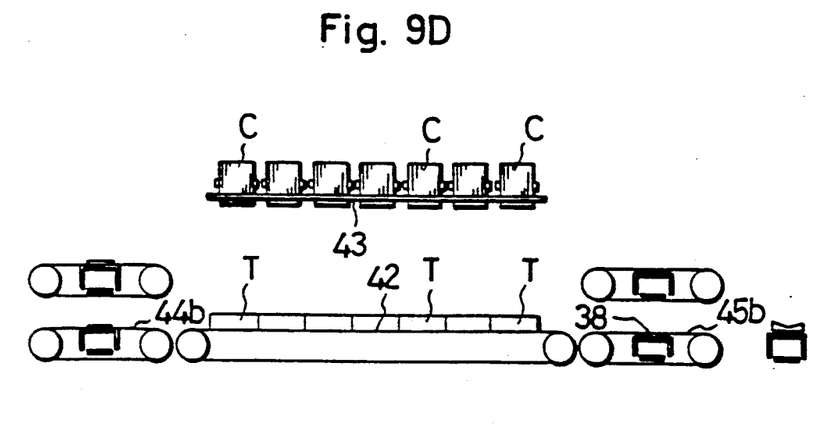
Figure 9E:
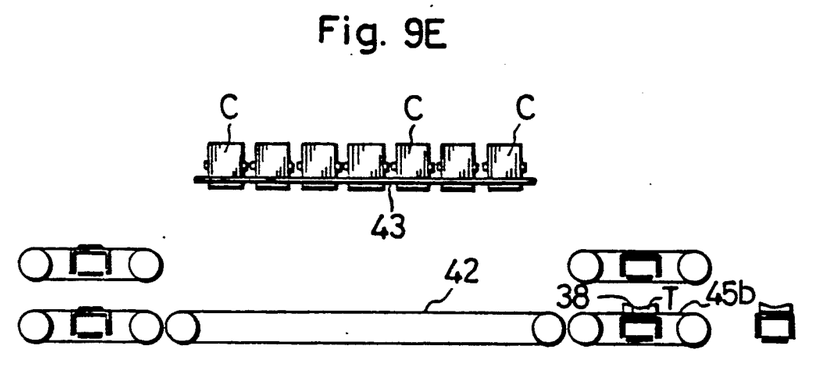
Figure 10A:
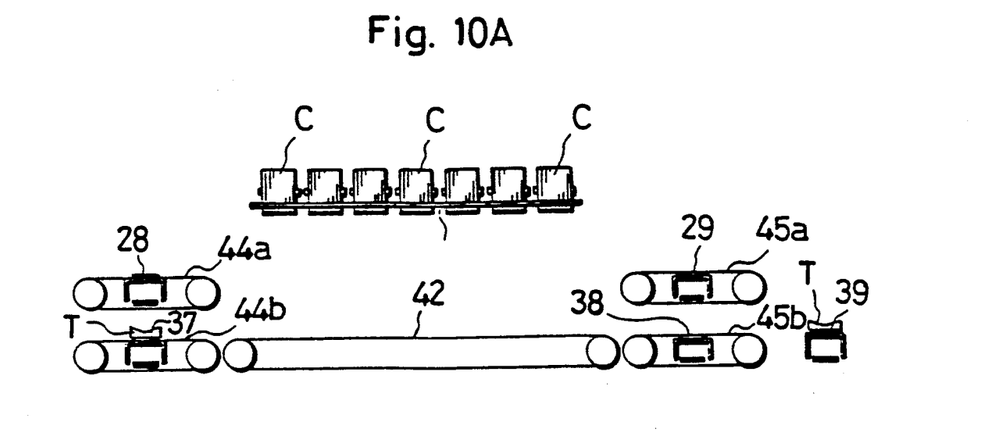
FIGS. 10(A) to 10(D) are diagrammatic views illustrating operation of the cheese stocker shown in FIG. 8 when a cheese is to be carried out.
Figure 10B:
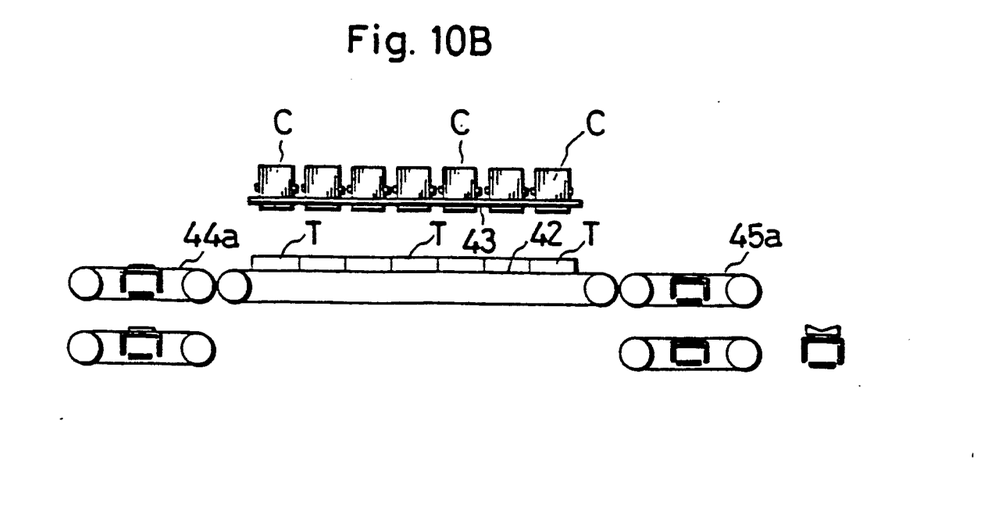
Figure 10C:
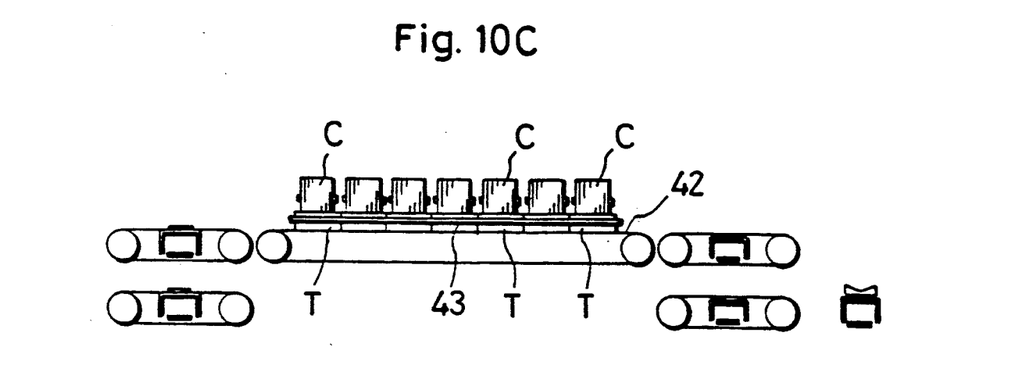
Figure 10D:
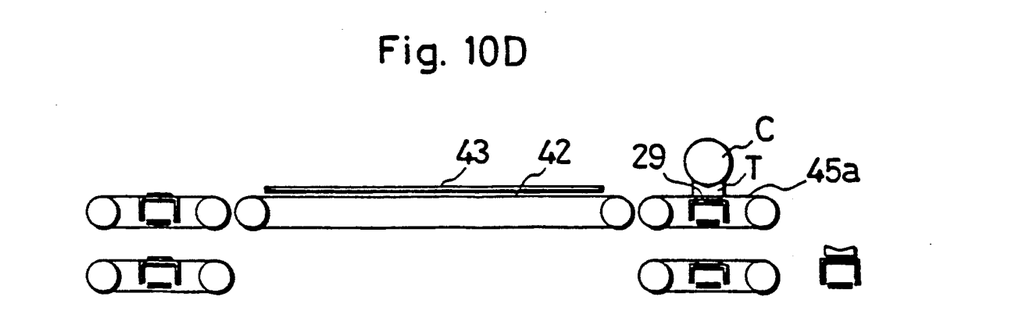

Then, the stocking conveyor 42 is moved down to its lowered position [FIG. 9(D)], and then the stocking conveyor 42, the discharging conveyor 45b at the lower stage and the empty tray conveyor 38 are operated. Consequently, the empty trays T on the stocking conveyor 42 are transported onto the empty tray conveyor 38 [FIG. 9(E)].

The cheese C stocked in such a manner as described above are transported from the cheese stocker 40 in such a manner as shown in FIGS. 10(A) to 10(D). In particular, the stocking conveyor 42 is moved down first [FIG. 10(A)], and then a predetermined number of empty trays T are transported onto the stocking conveyor 42 by way of the empty tray conveyor 37 and the supplying conveyor 44b at the lower stage. Then, the stocking conveyor 42 is moved up [FIG. 10(B)] and then the holder rods 43 are moved down [FIG. 10(C)]. Consequently, the cheeses C are transferred to the trays T. After then, the stocking conveyor 42, the discharging conveyor 45a at the upper stage and the occupied tray conveyor 29 are operated. Consequently, the cheeses C are discharged as occupied trays T onto the occupied tray conveyor 29 [FIG. 10(D)].

The cheese stocker 40 can stock cheeses C beginning with the bottom stage and discharge them beginning with the top stage for each stocking block 41a using a pair of holder rods 43 for each stage. Such operation is quite similar with all of the stocking blocks 41a, and one of the stocking blocks 41a to be used when occupied trays T and empty trays T are carried in to the cheese stocker 40 is selecteed by operating the orientation changing device not shown at each of the crossing points between the occupied tray conveyor 21 and supplying conveyor 44a and between the empty tray conveyor 33 and supplying conveyor 44b. Further, if, in this instance, type information in the identifying unit Ta of an occupied tray T is read and the orientation changing device is operated in response to the thus read type information, then cheeses C of a particular type can be classified and transported into a particular stocking block 41a.

Further, if an instruction to box cheeses C of a particular type is provided to the packing line 50, then such boxing instruction is transmitted to the cheese stocker 40, and the cheese stocker 40 discharges cheeses of the specified type in the form of occupied trays T onto the occupied tray conveyor 22. The thus discharged occupied trays T are transported to the boxing device 51, and the cheeses C are boxed into a predetermined case and then bundled by the bundling device 52, whereafter they are discharged by way of the case conveyor 53 to and stocked on one of the case stockers 54 for the type.

Meanwhile, the empty trays T are returned to the tray stocker 45 by way of the empty tray conveyor 39. Further, if the cheese stocker 40 demands for empty trays T then, then empty trays T are forwarded into the cheese stocker 40 by way of the empty tray conveyor 37. Empty trays T from the cheese stoker 40 are similarly returned to the tray stocker 35 or cheese stocker 40 by way of the empty tray conveyor 37 or 38.

The tray stocker 35 is disposed between the boxing device 51 and the unloaders 23, and the unloaders 23 are interconnected by way of the empty tray conveyor 34 and a pair of branches 34a of the empty tray conveyor 34. The tray stocker 35 temporarily stockes empty trays T therein to adjust the quantities of empty trays T consumed by the unloaders 23 and empty trays T returned from the cheese stocker 40 and boxing device 51 to eliminate a possible imbalance between the quantities.

As described so far, with the present system, even if cheeses C wound up by winders W are of different type, for example, for the individual winders W, information of suuch types is written into and stored in the identifying unit 12c belonging to the overhead conveyor 10 for individual cheeses C and is then read when the cheeses C are transported. The thus read type information is transferred into and stored in the identifying units Ta of occupied trays T on which the cheeses C are carried. Thus, the cheese stocker 40 classifies and stocks therein the cheeses C for the different types in accordance with such type information. Consequently, the cheese stocker 40 can stock cheeses C at particular stages of particular stocking blocks 41a for different types.

Further, the cheese stocker 40 discharges predetermined cheeses C in response to a boxing instruction from the packing line 50, and the packing line 50 receives and boxes the cheeses C into a case and then discharges the case to one of the case stockers 54 for the type of the cheeses C so that they may be thereafter stocked in the case stocker 54.

What is claimed is:

1. A cheese transporting processing apparatus for classifying cheeses wound up by winders for different types, stocking the thus classified cheeses therein and packing the thus stocked cheeses for the different types, comprising:
    an overhead conveyor with a type identifying unit for loading a wound up cheese onto a carrier by means of a lifter;
    a conveyor for transporting a tray on which a cheese unloaded from said overhead conveyor by means of an unloader is carried;
    a cheese stocker for stocking cheeses of each type between a pair of holder rods thereof and discharging such cheeses for each type; and
    a packing line for packing cheeses for each type.

2. A cheese transporting processing apparatus according to claim 1, wherein said overhead conveyor includes a plurality of carriers which are circulated by means of an endless chain and includes each a pair of support rods for supporting a lower portion of a cheese thereon, and a type identifying unit for writing information of a type of a cheese is provided for each of said carriers.

3. A cheese transporting processing apparatus according to claim 1, wherein a traverse conveyor provided for movement in a horizontal direction with a predetermined number of cheeses of a same type received in a row thereon and a plurality of stock conveyors for individually receiving cheeses of different types in rows thereon are provided on the carrying in side of said cheese stocker, and a shutter and an inspecting unit are provided on the cheese carrying in side of said stock conveyors.

4. A cheese transporting processing apparatus according to claim 3, wherein a transfer device for taking out a cheese placed on a tray from the tray is provided for said traverse conveyor and includes a pair of parallel rods provided for up and down movement.

5. A cheese transporting processing apparatus according to claim 1, wherein an occupied tray conveyor and an empty tray conveyor are provided at two upper and lower stages on the carrying in side of said cheese stocker while another occupied tray conveyor and another empty tray conveyor are provided on the carrying out side of said cheese stocker, and a stocking conveyor which is provided between said pair of holder rods is constructed for up and down movement to a position corresponding to any of said conveyors while a supplying conveyor set and a discharging conveyor set are interposed in parallel to said stocking conveyor between said stocking conveyor and said occupied tray conveyors and empty tray conveyors.

6. A cheese transporting processing apparatus according to claim 3 or 5, wherein an empty tray from which a cheese has been unloaded on the carrying in side of said cheese stocker is loaded onto said empty tray conveyor, and said empty tray conveyor is connected to said unloader by way of a tray stocker.

7. A cheese transporting processing apparatus according to claim 1, wherein a type identifying unit into which information of a type of a cheese can be written is provided for each of the trays.

8. A cheese transporting processing apparatus according to claim 1, wherein a plurality of pairs of holder rods are disposed at several stages for upward and downward movement in a vertical direction in said cheese stocker and have a length sufficient to allow a unit member of cheeses for the packing to be stocked therein.

9. A cheese transporting processing apparatuus according to claim 1, wherein said packing line includes a can producing machine, a boxing device, a sealing machine, a bundling device and a case stocker which are all interconnected by way of a cheese conveyor and a case conveyor such that cheeses boxed in cases for the individual types are discharged for the individual type from said packing line.

* * * * *